United States Patent
Peng et al.

(10) Patent No.: US 8,010,547 B2
(45) Date of Patent: Aug. 30, 2011

(54) NORMALIZING QUERY WORDS IN WEB SEARCH

(75) Inventors: Fuchun Peng, Sunnyvale, CA (US);
George H. Mills, Palo Alto, CA (US);
Benoit Dumoulin, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 589 days.

(21) Appl. No.: 12/103,382

(22) Filed: Apr. 15, 2008

(65) Prior Publication Data

US 2009/0259643 A1 Oct. 15, 2009

(51) Int. Cl.
*G06F 17/30* (2006.01)

(52) U.S. Cl. ........... 707/759; 707/736; 707/999.001; 707/999.002; 707/999.003; 715/257

(58) Field of Classification Search .......... 707/736, 707/759, 999.001, 999.102; 715/257
See application file for complete search history.

(56) References Cited

U.S. PATENT DOCUMENTS

| | | | |
|---|---|---|---|
| 5,765,147 A | 6/1998 | Mattos et al. | |
| 5,960,428 A | 9/1999 | Lindsay et al. | |
| 5,987,453 A | 11/1999 | Krishna et al. | |
| 6,134,540 A | 10/2000 | Carey et al. | |
| 6,397,204 B1 | 5/2002 | Liu et al. | |
| 6,477,525 B1 | 11/2002 | Bello et al. | |
| 6,640,221 B1 | 10/2003 | Levine et al. | |
| 6,732,096 B1 | 5/2004 | Au | |
| 6,912,524 B2 | 6/2005 | Acharya et al. | |
| 7,146,416 B1* | 12/2006 | Yoo et al. | 709/224 |
| 7,188,098 B2 | 3/2007 | Chen et al. | |
| 7,337,163 B1 | 2/2008 | Srinivasan et al. | |
| 2005/0278292 A1* | 12/2005 | Ohi et al. | 707/1 |
| 2008/0040323 A1 | 2/2008 | Joshi | |

OTHER PUBLICATIONS

"PHP—Spell Checking," retrieved Mar. 31, 2008, from http://www.linuxformat.co.uk/wiki/index.php/PHP_-_Spell_checking (5 pages).

* cited by examiner

*Primary Examiner* — Apu M Mofiz
*Assistant Examiner* — Monica M Pyo
(74) *Attorney, Agent, or Firm* — Nathan O. Greene; Brinks Hofer Gilson & Lione

(57) ABSTRACT

A method for normalizing query words in web search includes populating a dictionary with join and split candidates and corresponding joined and split words from an aggregate of query logs; determining a confidence score for join and split candidates, a highest confidence score for each being characterized in the dictionary as must-join and must-split, respectively; accepting queries with words amenable to being split or joined, or amenable to an addition or deletion of a hyphen or an apostrophe; generating, based on the accepted queries, split candidates obtained from the dictionary, and candidates of join, hyphen, or apostrophe algorithmically; and submitting to a search engine the generated possible candidates characterized as must-join or must-split in the dictionary, to improve search results returned in response to the queries; applying a language dictionary to generated candidates not characterized as must-split or must-join, to rank them, and submitting those highest-ranked to the search engine.

14 Claims, 3 Drawing Sheets

NORMALIZING QUERY WORDS IN WEB SEARCH

BACKGROUND

1. Technical Field

The disclosed embodiments relate to systems and methods for normalizing query words in web search, and more specifically, for the reformulation of queries received from users before submission to a search engine to account for cases of split, join, hyphen, and apostrophe.

2. Related Art

Internet advertising is a multi-billion dollar industry and is growing at double digits rates in recent years. It is also the major revenue source for internet companies, such as Yahoo!® or Google®, which provide advertising networks that connect advertisers, publishers, and Internet users. A major portion of revenue has historically come from sponsored search advertisements and other advertising related to search through search engines, for instance.

A search engine is a computer program running a server that helps a user to locate information. Using a search engine, a user can enter one or more search query terms and obtain a list of resources that contain or are associated with subject matter that matches those search query terms. While search engines may be applied in a variety of contexts, search engines are especially useful for locating resources that are accessible through the Internet. Resources that may be located through a search engine include, for example, files whose content is composed in a page description language such as Hypertext Markup Language (HTML). Such files are typically called pages. One can use a search engine to generate a list of Universal Resource Locators (URLs) and/or HTML links to files, or pages, that are likely to be of interest.

Some search engines order a list of files (or web pages) before presenting the list to a user. To order a list of files, a search engine may assign a rank to each web page in the list. When the list is sorted by rank, a web page with a relatively higher rank may be placed closer to the head of the list than a file with a relatively lower rank. The user, when presented with the sorted list, sees the most highly ranked web pages first. To aid the user in his search, a search engine may rank the web pages according to relevance. Relevance is a measure of how closely the subject matter of the file matches query terms.

To find the most relevant web pages, search engines typically try to select, from among a plurality of web pages, files that include many or all of the words that a user entered into a search request. Unfortunately, the web pages in which a user may be most interested are too often web pages that do not literally include the words that the user entered into the search request. If the user has misspelled a word in the search request, then the search engine may fail to select files in which the correctly spelled word occurs. Typically, eight to ten percent of queries to web search engines have at least one query term that is misspelled.

The core, or organic, search results are usually based on some relevancy model while other parts of the search results web page are set apart for sponsored search advertisements paid for by advertisers to be returned with the organic search results for specific keywords. Without returning relevant results, however, user satisfaction with a search engine is likely to decline and, therefore, so will advertisers interested in sponsored search listings that target those users.

Accordingly, a search engine needs to return results as relevant as possible to the entered search terms, regardless of whether a searching user properly spells or types in the terms of his or her search. Models have been developed to manipulate misspelled or mistyped terms, also referred to as canonicalization. The canonicalization of search terms used in queries and search listings removes common irregularities of search terms entered by searchers and web site promoters, such as capital letters and pluralizations, in order to generate relevant results.

The algorithms and systems for dealing with misspellings, however, do not handle well special cases of irregularities, and re-programming or re-designing such algorithms and systems would take significant time, effort, and expense. Such irregularities include, for instance, dealing with split words that should be joined, with joined words that should be split, and with various words that should include or exclude a hyphen or an apostrophe.

SUMMARY

By way of introduction, the embodiments described below are drawn to systems and methods for normalizing query words in web search, and more specifically, for the reformulation of queries received from users before submission to a search engine to account for cases of split, join, hyphen, and apostrophe.

In a first aspect, a method is disclosed for normalizing query words in web search, the method including building a dictionary of a plurality of possible word normalizations from query words previously entered into a search engine, wherein the normalizations include candidates of splitting at least one query word; accepting queries including one or more words amenable to being split or joined, or amenable to an addition or deletion of a hyphen or an apostrophe; reformulating the queries to generate based thereon possible split candidates from the dictionary, and possible candidates of join, hyphen, or apostrophe algorithmically, wherein the reformulated queries include generated candidates that are certain as to correctness and those that carry at least some uncertainty as to correctness; applying a language model to the uncertain reformulated queries to rank them according to a probability of being located in an aggregate of query logs; and submitting the certain reformulated queries in addition to one or more of the highest-ranked uncertain reformulated queries to the search engine to improve search results returned in response to the queries.

In a second aspect, a method is disclosed for normalizing query words in web search including building, offline, a dictionary by populating it with join and split candidates and corresponding joined and split words from an aggregate of query logs; determining a confidence score for each join or split candidate, wherein a highest confidence score for each is characterized in the dictionary as must join and must-split, respectively; accepting queries including one or more words amenable to being split or joined, or amenable to an addition or deletion of a hyphen or an apostrophe; generating, based on the accepted queries, possible split candidates obtained from the dictionary, and possible candidates of join, hyphen, or apostrophe algorithmically; and automatically submitting to a search engine the generated possible candidates characterized as must-join or must-split in the dictionary, to improve search results returned in response to the accepted queries.

In a third aspect, a system is disclosed for normalizing query words in web search including a communicator operably coupled with a search engine and to receive search queries from users. A memory is for storing computer instructions to be executed by a processor. A dictionary database is coupled with the memory and the processor, and that is populated with a plurality of possible word normalizations from words located in query logs of the search engine, wherein the normalizations include candidates of splitting at least one query word. A reformulator is coupled with the dictionary database, the memory, and the processor, and operable to reformulate the queries to generate based thereon possible split candidates from the dictionary, and possible candidates of join, hyphen, or apostrophe algorithmically. The reformulated queries include those that are certain as to correctness and those that carry at least some uncertainty as to correctness. A language modeler is coupled with the reformulator and the processor, the language modeler operable to apply at least one language model to the uncertain reformulated queries to rank them according to a probability of being found in an aggregate of the query logs. The communicator is operable to submit the certain reformulated queries in addition to one or more of the highest-ranked uncertain reformulated queries to the search.

In a fourth aspect, a system is disclosed for normalizing query words in web search including a communicator operably coupled with a search engine and to receive search queries from users comprising words amenable to being split or joined, or amenable to an addition or deletion of a hyphen or an apostrophe. A memory is for storing computer instructions to be executed by a processor. A dictionary database is coupled with the memory and the processor, and that is populated with a plurality of join and split candidates, and corresponding joined and split words, located in an aggregate of query logs of the search engine. The processor determines a confidence score for each joint or split candidate, wherein a highest confidence score for each is characterized in the dictionary database as must-join and must-split, respectively. A reformulator is coupled with the dictionary database, the memory, and the processor, and operable to generate, based on the queries received from the users, possible split candidates that are found in the dictionary, and possible candidates of join, hyphen, or apostrophe algorithmically. The processor and the communicator are operable to automatically submit to the search engine the generated candidates characterized as must-join or must-split in the dictionary, to improve search results returned in response to the queries.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
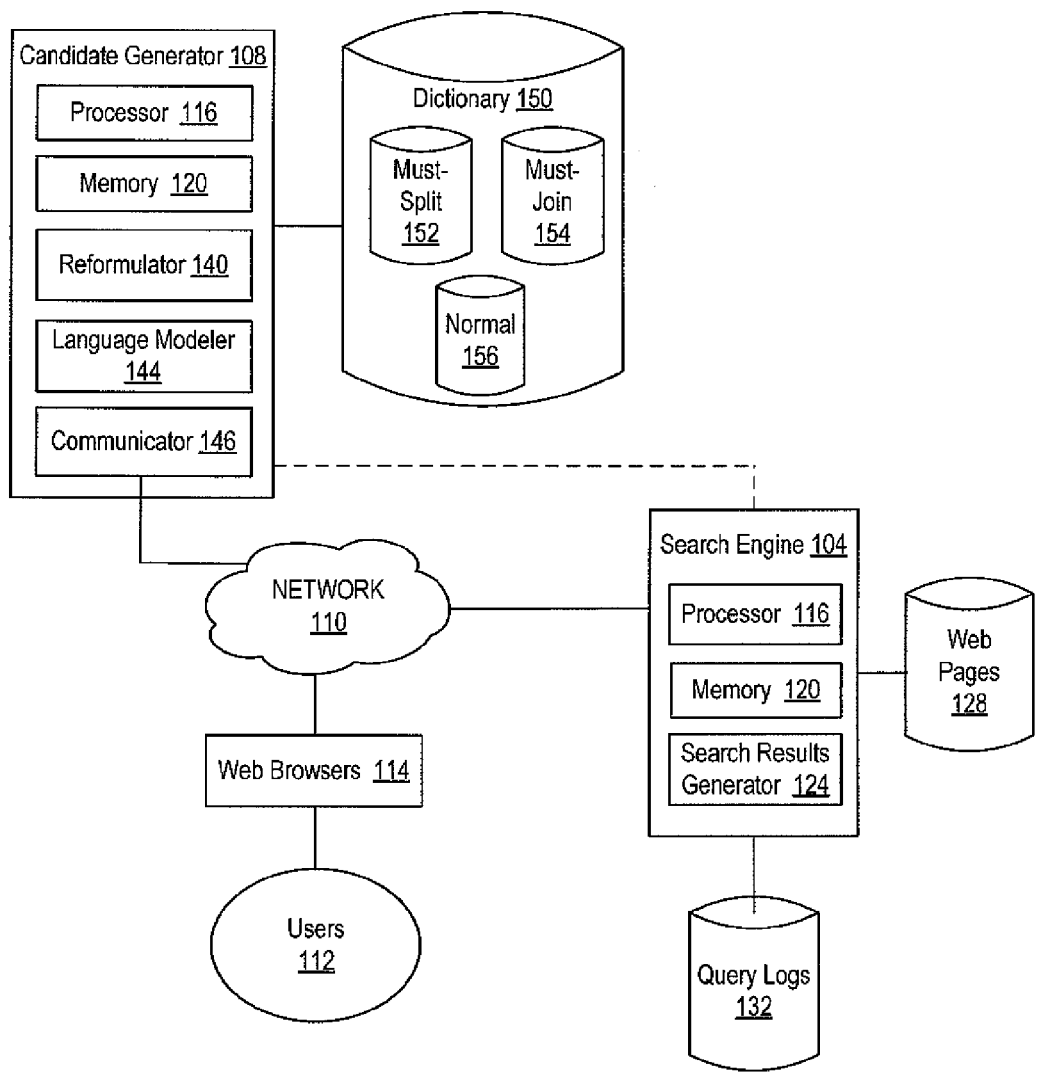
FIG. 1 is a diagram of an exemplary system for normalizing query words in web search, and specifically, for the reformulation of queries received from users before submission to a search engine to account for cases of split, join, hyphen, and apostrophe.

By way of introduction, the disclosed embodiments relate to systems and methods for normalizing query words in web search, and more specifically, for the reformulation of queries received from users before submission to a search engine to account for cases of split, join, hyphen, and apostrophe. Accordingly, the disadvantages of returning irrelevant results when a wrongly typed word or words in a query is received by a search engine are avoided.

As discussed above, current systems, algorithms, and/or methods used to handle regular misspellings do not handle well special cases of words that may need to be split, joined, or need to have inserted or deleted a hyphen or an apostrophe. Typically, prior methods of handling misspellings include suggesting an alternative to the searching user who can choose the alternative spelling or not. This may also be referred to as "highlighting" the misspelled term for the user. The disclosed embodiments handle the specialized cases of misspelling (split, join, hyphen, and apostrophe) without changing existing misspelling correction systems, and do so in a simple and effective manner. When used in practice for purposes of experimentation, the disclosed embodiments significantly improve search results.

Normalization is the process of reducing complex data structure into its simplest, most stable structure. In general, the process of normalization entails the removal of redundant attributes, keys, and relationships from a conceptual data model. It is a mathematical process that adjusts for differences among data from varying sources in order to create a common basis for comparison. Normalization is also referred to as the transformation of data to a normal form, for instance, to unify spelling. A normalized data structure minimizes data redundancy and data element coupling, and maximizes data element cohesion.

By way of example, a special case of split normalization may be needed when a query term is written as "hongkong" or "southwestairlines." These search terms were obviously inadvertently combined when they need to be written with spaces in between some of the constituent words, such as "hong kong" and "Southwest Airlines." In contrast, examples of terms needing to be joined include "my space," "home page finder," or "web md stock." That is, these terms should be combined to read "myspace," "homepage finder," and "webmd stock." Furthermore, examples of dealing with hyphens include deleting the hyphen in some cases for the terms "run-on" or "e-mail." Examples of dealing with apostrophes include detecting words ending with an "s" or another word that may require an apostrophe and does not have one, such as "Macys," "Togos," or "dont." Other cases may require that the apostrophe be deleted from a word such as "their's." Note that in many cases fixing the above special cases of misspellings are commercially oriented, and therefore of special interest to the advertisers who pay for sponsored advertisements related to the search terms.

FIG. 1 is a diagram of an exemplary system 100 for normalizing query words in web search, and specifically, for the reformulation of queries received from users before submission to a search engine 104 to account for cases of split, join, hyphen, and apostrophe. The system 100 may include a candidate generator 108, a network 110, and multiple users 112 that search using the search engine 104 through a variety of web browsers 114 that communicate over the network 110. The search engine 104 may be located remotely over the network 110 with reference to the candidate generator 108, and the two may be operably coupled with each other or even be part of the same server or computer, as indicated by the dashed line. Herein, the phrase "coupled with" is defined to mean directly connected to or indirectly connected through one or more intermediate components. The network 110 may include the Internet or World Wide Web ("web"), a wide area network (WAN), a local area network ("LAN"), and/or an extranet, connected to through use of either a wired or wireless connection.

The search engine 104 may include a processor 116, a memory 120, a search results generator 124, a web pages database 128, and a query logs database 132. Furthermore, the candidate generator 108 may include a processor 116, a memory 120, a reformulator 140, a language modeler 144, a communicator 146, and a dictionary database 150. The dictionary database 150 may include sub-dictionaries or subsections that include a must-split sub-dictionary 152, a must-join sub-dictionary 154, and a normal sub-dictionary 156. The communicator 146 of the candidate generator 108 may include a communication interface such that the candidate generator 108 can couple itself with the search engine 104 even if over the network 110. The processor 116 and the memory 120 may be coupled with the reformulator 140, the language modeler 144, and the communicator 146 and with each other.

As the users 112 submit queries to the search engine 104, the search results generator 124 searches for the closest approximation of that term among the web pages of the web pages database 128, and returns the same to the web browsers 114 of the user 112. Oftentimes, the users 112 will re-formulate their queries in search of more accurate or relevant search results. In some cases, the users 112 may do so to spell them correctly, including adjusting the words for issues related to cases of split, join, hyphen, and apostrophe as discussed above. The search engine 104 is capable of tracking these multiples of search queries and storing them in the query logs database 132. The candidate generator 108 has access to these query logs and may use them to build the dictionary database 150. For purposes of the present embodiments, the only terms that need to be gathered into the dictionary database 150 are those related to split or join cases of normalization, e.g., that contain words that are amenable to being split or joined to be normalized. Other terms that may need normalization, however, may be stored in the dictionary database 150 as well as will be discussed.

Through this process, a dictionary database 150 of hundreds of thousands candidates for normalization (and their corresponding normalized candidate term(s)) may be built from entries from the query logs for use by the present embodiments. Additionally, a confidence score may be generated by the processor 116 in conjunction with each of the possible candidates, which may, for instance, be based on the frequency of use as a submitted query and may range from zero (0) to one (1). As example only, the confidence score from "zipcodeinfo" for "zip code information" may be a 1. The confidence score for "you tube" to "youtube" may be 0.971 while for "youtube" to "you tube" may be only 0.68.

With these confidence scores, the sub-dictionaries are created, including the must-split sub-dictionary 152, the must-join sub-dictionary, and the normal sub-dictionary 156. The must-split sub-dictionary 152 contains all the split candidates with confidence scores of 1 or some predetermined high threshold value, such as 0.985 and above. The must-join sub-dictionary 154 may contain all join candidates with confidence scores of 1 or some predetermined high threshold value, such as 0.980 and above. All other candidates falling outside the above-described ranges, and therefore also outside of the must-split and must-join sub-dictionaries 152, 154 are stored in the normal sub-dictionary by default. While the candidates for addition or deletion of a hyphen or an apostrophe may also be stored in the normal dictionary 156, this is not necessary as long as the candidate generator 108 has access to the query logs database 132 of the search engine. Doing so, however, may be desirable because the language modeler 144 will access these candidates during language modeling (described below) and having them stored locally may speed up processing.

The candidates for normalization, when the candidate generator 108 is in receipt of a query, may be generated in the following ways. The candidates for join or for addition or deletion of a hyphen or an apostrophe may be generated algorithmically, on the fly, in response to a user query. For instance, when the candidate generator 108 receives a query (as an intermediary before submission of the query to the search engine 104) including the word "e-mail," it may automatically generate the terms "email" and "electronic mail," etc. to reformulate the original query to be considered for submission. The same is true of words such as "macys" or "togos," which may be reformulated as Macy's or Togo's for submission, just based on the makeup of the word and the algorithmic-possible variations thereof.

If the candidate generator 108 receives a query including the term "web med stock," it may automatically generate join candidates as "webmed stock," "web medstock," and "webmedstock." Because the generation of split candidates is not straight forward algorithmically, and may include complicated decisions as to where to insert one or more spaces in one or more query words, the generation of split candidates may be performed by comparing the query words with the split candidates in the dictionary database 150 and generating all possible candidates found in the dictionary database 150. This way of generating split candidates also will most consistently generate candidates most likely to be used on Internet web pages.

Figure 2:
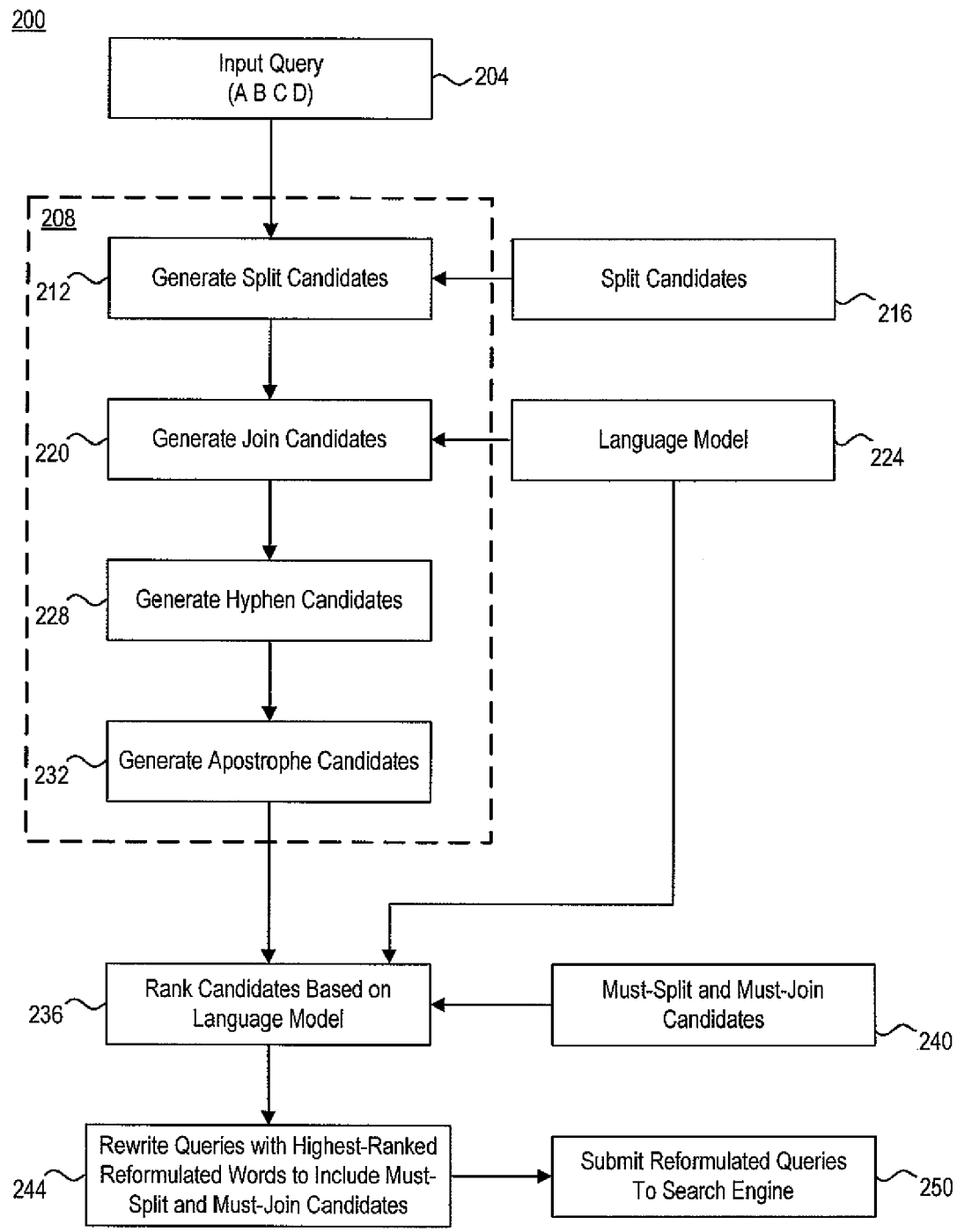
FIG. 2 is a flow diagram that provides an overall flow of the methods explained herein that receive a query and analyze it to decide what reformulations may be appropriate commensurate with this disclosure.

FIG. 2 is a flow diagram 200 that provides an overall flow of the methods explained herein that receive a query and analyze it to decide what reformulations may be appropriate commensurate with this disclosure. As discussed above, the candidate generator 108 may function as an intermediary between the searching users 112 and the search engine 104, to receive user search queries, analyze them, and submit reformulated queries to the search engine 104. Accordingly, at block 204, the communicator 146 receives the input query, which as displayed, includes words A, B, C, and D. At block 208, the reformulator 140 may reformulate the query to generate based thereon possible normalized candidates for submission to the search engine 104. For instance, at block 212, split candidates are generated, which may include, e.g., terms A1 and A2 for A and C1 and C2 for C. At block 216, the reformulator 140 compares the split candidates with those in the dictionary database 150 to generate split candidates.

At block 220, the reformulator 140 may algorithmically generate join candidates as discussed above. The reformulator 140 may also set a limit as to how many of the words may be joined, up to a predetermined number (N) of words. For instance, in the current example, N may be limited to three. Accordingly, the following list of join candidates are generated: AB C D; A BC D; A B CD; AB CD; ABC D; and A BCD. Note that ABCD is not a candidate because it would require N to be 4. Also, possible combinations that would require rearranging the terms A B C and D are not generated because it would be unlikely for such terms to require combination after being rearranged. At block 224, a language model of the language modeler 144 may filter out invalid words within the join candidates after being joined, e.g., those that are not English words. This may reduce the number of total join candidates, but will reduce the amount of work required by the language modeler 144 to analyze and rank them before rewriting the query.

At block 228, the reformulator 140 may algorithmically generate hyphen candidates. At block 232, the reformulator 140 may algorithmically generate apostrophe candidates. Once all of the possible candidates have been generated, they are sent to be ranked, at block 236, by a language model from block 224 of the language modeler 144. The language model is used to gauge the potential accuracy of each reformulated candidate, calculating the probability of accuracy to be able to then rank the various candidates according to their probabilities, for instance higher probabilities ranked higher than those with lower probabilities. The language model, in ranking at block 236, may also determine which of the query words match those in the must-split and must-join sub-dictionaries 152, 154, at block 240, to then rank those words the highest because they will automatically be included in the rewritten query.

At block 244, the reformulator 140 rewrites the queries with the highest-ranked reformulated words, to include any must-split or must-join candidates that were generated in blocks 212 and 220. At block 250, the candidate generator 108, through the communicator 146, submits the reformulated queries to the search engine 104.

Language Model

A language model as disclosed herein computes the probability of a string of words based on a frequency of past use to predict future use. A bi-gram language model may be employed, which assumes the current word only depends on its previous word. With such a model, the probability of a string "A B C D," P(A B C D), can be calculated as $$P(A)P(B|A)P(C|B)P(D|C), \qquad (1)$$

where P(A) is the probability of finding word A in the query logs database 132. P(A) may be expressed as $$\frac{\#(A) - c}{\sum \#(x)}, \qquad (2)$$

where #(A) is the frequency of word A in the query logs, x is any word, c is a small constant (for instance, between 0 and 1) to smooth the probability.

P(B|A) is the conditional probability of word B being located next to A. It equals $$\frac{\#(AB) - c}{\#(A)}, \qquad (3)$$

where #(AB) is the frequency of word string "A B", and c is a smoothing constant. Note that there are many smoothing methods known in the art, and the present embodiments are not to be limited the above exemplary smoothing method. After the probability of each reformulation is calculated, the reformulated query may be ranked, highest to lowest. If the best or highest-ranked reformulation is not the same as the original input, the original query is rewritten to include this highest-ranked reformulation, which is then submitted to the search engine 104. Rewriting strategies may include the following. If it is decided that "AB C D" is a better reformulation of "A B C D", an equivalence between "AB" and "A B" may be created using a UNIT operator such as the "OR" operator. Other operators such as "AND" may be more appropriate in other cases, such as for cases of split so that both terms in the original combined word have to be in a search result.

Figure 3:
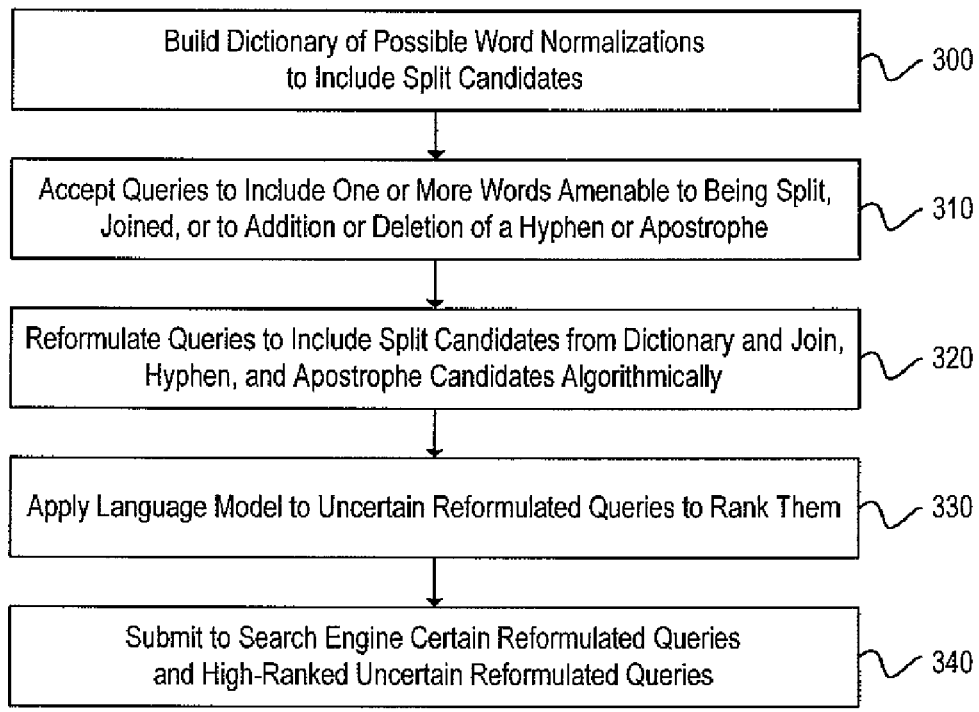
FIG. 3 is a flow chart of an exemplary method for normalizing query words in web search queries.

FIG. 3 is a flow chart of an exemplary method for normalizing query words in web search queries. The method, at block 300, builds a dictionary of a plurality of possible word normalizations from query words previously entered into a search engine, wherein the normalizations include candidates of splitting at least one query word. At block 310, the method accepts queries including one or more words amenable to being split or joined, or amenable to an addition or deletion of a hyphen or an apostrophe. At block 320, the method reformulates the queries to generate based thereon possible split candidates from the dictionary, and possible candidates of join, hyphen, or apostrophe algorithmically. The reformulated queries include generated candidates that are certain as to correctness and those that carry at least some uncertainty as to correctness. At block 330, the method applies a language model to the uncertain reformulated queries to rank them according to a probability of being located in an aggregate of query logs. At block 340, the method submits the certain reformulated queries in addition to one or more of the highest-ranked uncertain reformulated queries to the search engine to improve search results returned in response to the queries.

Figure 4:
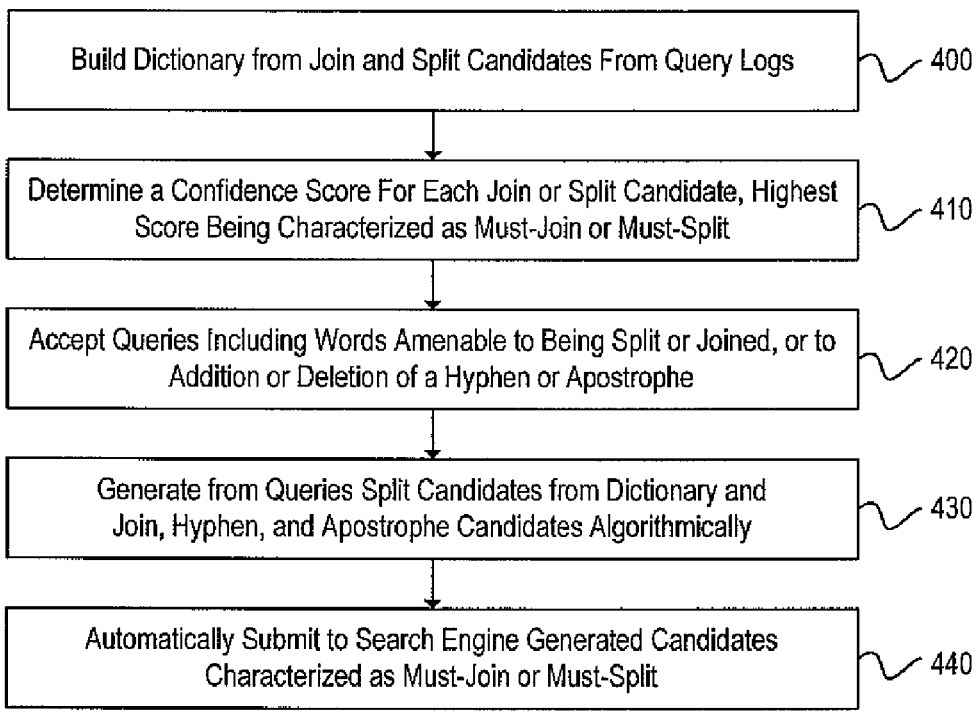
FIG. 4 is a flow chart of another embodiment of a method for normalizing query words in web search queries.

FIG. 4 is a flow chart of another embodiment of a method for normalizing query words in web search queries. The method, at block 400, builds, offline, a dictionary by populating it with join and split candidates and corresponding joined and split words from an aggregate of query logs. At block 410, the method determines a confidence score for each join or split candidate, wherein a highest confidence score for each is characterized in the dictionary as must-join and must-split, respectively. At block 420, the method accepts queries including one or more words amenable to being split or joined, or amenable to an addition or deletion of a hyphen or an apostrophe. At block 430, the method generates, based on the queries, possible split candidates obtained from the dictionary, and possible candidates of join, hyphen, or apostrophe algorithmically. At block 440, the method automatically submits to a search engine the generated candidates characterized as must-join or must-split in the dictionary, to improve search results returned in response to the queries.

In the foregoing description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts, or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A computer-implemented method for normalizing query words in web search, the method executable with a computer having a processor and memory, the method comprising:
building, by the processor, a dictionary of a plurality of possible word normalizations from query words previously entered into a search engine, wherein the normalizations comprise candidates of splitting at least one query word and candidates of joining at least two query words;
determining, by the processor, a confidence score with the split and join candidates based on a frequency of their occurrence in a plurality of query logs;
building, by the processor, three sub-dictionaries within the dictionary comprising must-split, must-join, and normal based on the confidence scores;
accepting a query including one or more words amenable to being split or joined;
reformulating, by the processor, the query to generate based on the one or more words possible split candidates from the dictionary and possible candidates of join algorithmically;
applying, by the processor, a language model to the possible split and join candidates to:
rank highest the candidates that match words in the must-split and must-join dictionaries; and
rank the candidates that match words in the normal sub-dictionary according to a probability of being located in the query logs; and
submitting, by the computer, the highest ranked candidates as a reformulated query to the search engine to improve search results returned in response to the reformulated query.

2. The method of claim 1, wherein reformulating further comprises generating hyphen and apostrophe candidates algorithmically.

3. The method of claim 1, wherein the must-split sub-dictionary contains split candidates with a confidence score of "1," the must-join sub-dictionary contains join candidates with a confidence score of "1," and the normal sub-dictionary contains all other split or join candidates where confidence scores rank from zero (0) to (1).

4. The method of claim 2, wherein the must-split sub-dictionary contains split candidates with a confidence score above a predetermined high threshold, the must-join sub-dictionary contains join candidates with a confidence score above a second predetermined high threshold, and the normal sub-dictionary contains all other split, join, hyphen, and apostrophe candidates.

5. The method of claim 4, further comprising:
comparing the generated candidates of the query with the candidates in the three sub-dictionaries;
automatically submitting to the search engine the generated candidates that are found in either the must-split or the must-join sub-dictionaries; and
applying the language model to the generated candidates that are found in the normal sub-dictionary.

6. The method of claim 5, wherein applying the language model comprises:
determining a probability that the generated candidates found in the normal sub-dictionary may be found in the query logs based on a frequency of their occurrence therein;
ranking the normal generated candidates based on their respective probabilities; and
rewriting the query using a highest-ranked normal generated candidate for submission to the search engine, wherein the highest-ranked normal generated candidate is different from the query originally accepted.

7. The method of claim 6, wherein algorithmically generated comprises:
detecting words containing a hyphen or an apostrophe, a word ending in an "s" that may need an apostrophe, or adjacent words amenable to being joined; and
rewriting the one or more words to exclude the hyphen, or to add or delete an apostrophe, or to join adjacent words amendable to being joined.

8. The method of claim 7, wherein the probabilities are determined using a bi-gram language model that assumes a probability of occurrence of a current word depends on co-occurrence with another word coming before the current word.

9. A system for normalizing query words in web search, the system comprising:
a communicator operably coupled with a search engine and to receive search queries from users;
a memory to store computer instructions to be executed by a processor;

a dictionary database coupled with the memory and the processor, and that is populated with a plurality of possible word normalizations from words located in query logs of the search engine, wherein the normalizations comprise candidates of splitting at least one query word and joining at least two query words;

the processor operable to determine a confidence score with the split and join candidates based on a frequency of their occurrence in the query logs and to build three sub-dictionaries within the dictionary database comprising must-split, must-join, and normal based on the confidence scores;

a reformulator coupled with the dictionary database and executable by the processor to reformulate one or more words of a query to generate based on the one or more words possible split candidates from the dictionary and possible candidates of join algorithmically; and a language modeler executable by the processor to apply at a language model to the possible split and loin candidates to:
   rank highest the candidates that match words in the must-split and must-join dictionaries; and
   rank the candidates that match words in the normal sub-dictionary according to a probability of being found in the query logs;

wherein the communicator is operable to submit the highest ranked candidates as a reformulated query to the search engine to improve search results returned in response to the reformulated query.

10. The system of claim 9, wherein the reformulator is operable to generate hyphen and apostrophe candidates algorithmically.

11. The system of claim 10, wherein the must-split sub-dictionary contains split candidates with a confidence score above a predetermined high threshold, the must-join sub-dictionary contains join candidates with a confidence score above a second predetermined high threshold, and the normal sub-dictionary contains all other split, join, hyphen, and apostrophe candidates.

12. The system of claim 11, wherein the reformulator is operable to compare the generated candidates of the query with the candidates in the three sub-dictionaries, and automatically submit to the search engine the generated candidates that are found in either the must-split or the must-join sub-dictionaries; and the language modeler is operable to apply the language model to the generated candidates that are found in the normal sub-dictionary.

13. The system of claim 12, wherein the language modeler is operable to:
   determine a probability that the generated candidates found in the normal sub-dictionary may be found in the query logs based on a frequency of their occurrence therein;
   rank the normal generated candidates of the reformulated query based on their respective probabilities; and
   rewrite the query using a highest-ranked, normal generated candidate for submission to the search engine, wherein the highest-ranked reformulated query is different from the query originally accepted.

14. The system of claim 10, wherein algorithmically generated comprises:
   detecting words containing a hyphen or an apostrophe, words that may need an apostrophe, or adjacent words amenable to being joined; and
   rewriting the one or more words to exclude the hyphen, or to add or delete an apostrophe, or to join adjacent words amenable to being joined.

\* \* \* \* \*